United States Patent [19]

Taniguchi

[11] Patent Number: 5,568,354
[45] Date of Patent: Oct. 22, 1996

[54] CHIP TYPE SOLID ELECTROLYTE CAPACITOR

[75] Inventor: Hiromichi Taniguchi, Tokyo, Japan

[73] Assignee: NEC Corporation, Tokyo, Japan

[21] Appl. No.: 505,997

[22] Filed: Jul. 24, 1995

Related U.S. Application Data

[63] Continuation of Ser. No. 190,482, Feb. 2, 1994, abandoned.

[30] Foreign Application Priority Data

Feb. 2, 1993 [JP] Japan .................................. 5-015114

[51] Int. Cl.⁶ .................................................. H01G 9/012
[52] U.S. Cl. ........................................................ 361/540
[58] Field of Search ................................... 361/523, 528, 361/529, 532–541; 29/25.03

[56] References Cited

U.S. PATENT DOCUMENTS

| | | | |
|---|---|---|---|
| 3,538,394 | 11/1970 | Bourgault et al. | 361/540 |
| 4,203,194 | 5/1980 | McGrath | 29/25.03 |
| 5,254,137 | 10/1993 | Mitani | 29/25.03 |

FOREIGN PATENT DOCUMENTS

| | | | |
|---|---|---|---|
| 0518258 | 12/1992 | European Pat. Off. | 361/523 |
| 3931266 | 3/1991 | Germany | 361/540 |
| 2125603 | 5/1990 | Japan | 361/523 |

OTHER PUBLICATIONS

IBM Technical Disclosure Bulletin, vol. 28, No. 3 Aug. 1985, pp. 1310–1311, "Non–Reversible Surface–mounted Chip Capacitor".

*Primary Examiner*—Teresa J. Walberg
*Assistant Examiner*—Gregory L. Mills
*Attorney, Agent, or Firm*—Sughrue, Mion, Zinn, Macpeak & Seas

[57] ABSTRACT

A chip type solid electrolyte capacitor is given a three-terminal structure, with cathode terminals at either end and an anode lead embedded in an anode body at the center of the device structure. This eliminates the possibility of device breakdown or short circuit when a chip-type solid electrolyte capacitor with rectifying characteristics is inadvertently mounted the wrong way on a circuit board, and assures a small device size.

7 Claims, 3 Drawing Sheets

CHIP TYPE SOLID ELECTROLYTE CAPACITOR

This is a Continuation of application Ser. No. 08/190,482 filed Feb. 2, 1994 abandoned.

BACKGROUND OF THE INVENTION

This invention relates to a chip type solid electrolyte capacitor, particularly to the terminal structure thereof.

Conventional chip type solid electrolyte capacitors include those of plastic molded type formed by connecting external anode and cathode leads 21, 22 respectively to the terminals of a capacitor device 1 fabricated according to a known technique, followed by armoring with a molding plastic 20, as shown in FIG. 1; and those of simplified plastic armored type formed by briefly armoring the capacitor device 1 with a plastic 30, for example, by fluidized bed dip coating method, followed by formation of external anode and cathode terminal electrodes 31, 32 respectively to the terminals of the device directly without using external anode and cathode leads, as show in FIG. 2.

In such a type of conventional chip type solid electrolyte capacitor, the capacitor device itself has rectifying characteristics, so that a voltage can be applied reversely across the electrodes if the capacitor is mounted onto a circuit board with wrong polarity orientation of the terminal electrodes, leading to dielectric breakdown of the device, a flushof great short-circuit current to elevate the temperature of the capacitor device and finally to burning thereof, disadvantageously.

Therefore, it is an object of the invention to provide a chip type solid electrolyte capacitor in which such accidents as a voltage being applied reversely thereto, when mounted onto the circuit board, due to erroneous orientation or wrong polarity of the chip type solid electrolyte capacitor employing a capacitor device having rectifying characteristics which leads to breakdown of the capacitor device can be prevented. This chip capacitor has cathode terminals at each end and an anode terminal at the center. Since the capacitor is of a three-terminal structure, the polarity of the capacitor is not in question when mounting onto a circuit board.

SUMMARY OF THE INVENTION

The chip type solid electrolyte capacitor according to this invention comprises a device consisting of an anode body made of a valve-active metal, having an anode lead embedded therein, on which an oxide layer, a solid electrolyte layer and a cathode conductive layer are formed successively; an insulating armor resin layer formed on the entire circumference of the device except for the two opposite faces adjacent to the anode lead lead-through face; a couple of cathode terminal electrodes formed on the two faces at which the cathode conductive layer is exposed and on the insulating resin layer therearound; and an anode terminal electrode which is connected to the anode lead and formed at the central zone of the chip.

BRIEF DESCRIPTION OF THE DRAWINGS

The features of this invention that are believed to be novel are set forth with particularity in the appended claim. The invention, together with the objects and advantages thereof, may best be understood by reference to the following description of preferred embodiments taken in conjunction with the accompanying drawings in which:

DESCRIPTION OF PREFERRED EMBODIMENT

Figure 1:
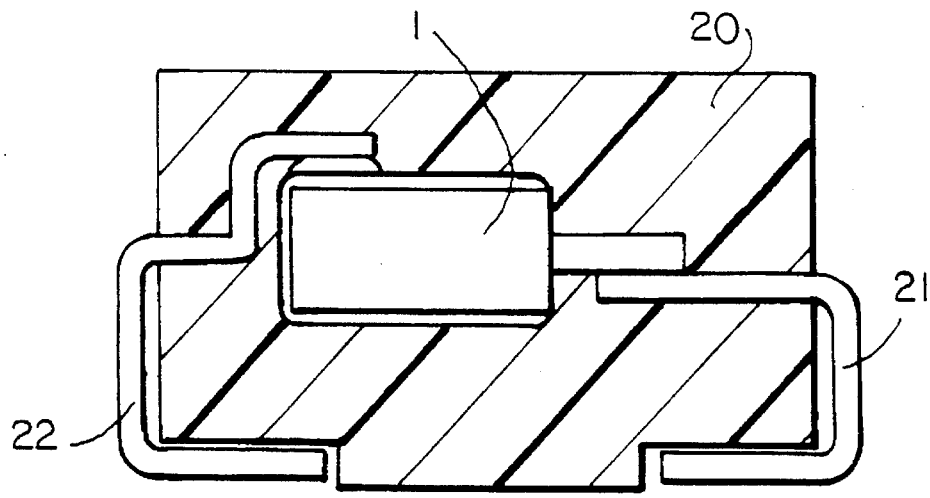
FIG. 1 shows in cross section a prior art molding plastic armored chip type solid electrolyte capacitor.
Figure 2:
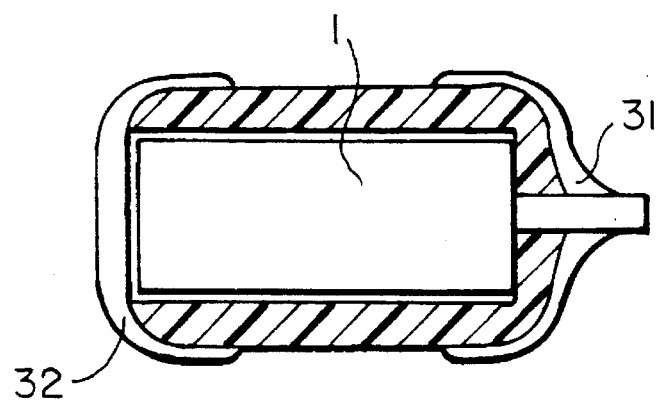
FIGS. 2 shows in cross section a prior art simplified plastic armored type chip type solid electrolyte capacitor.
Figure 3A:
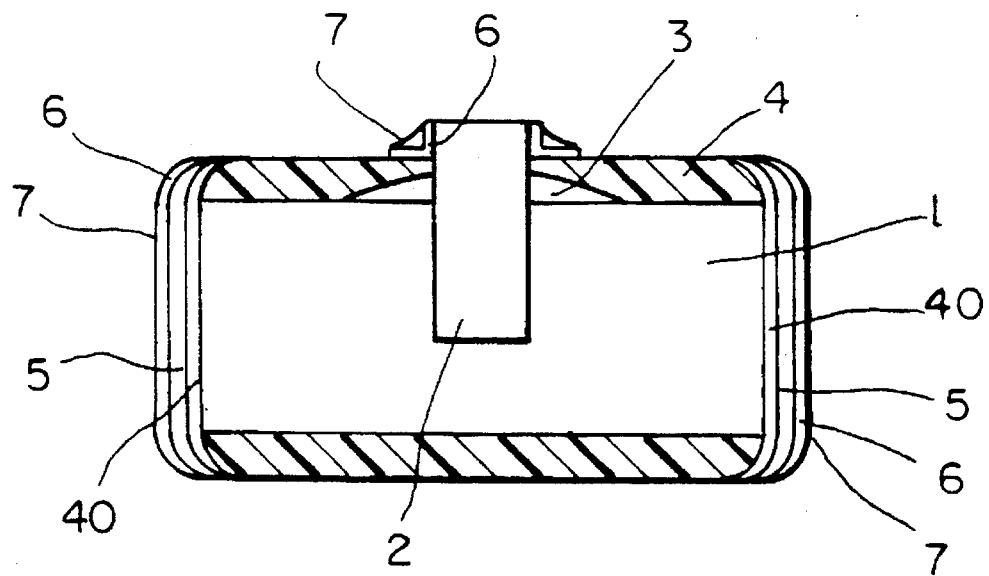
FIG. 3 shows a cross section of a chip type solid electrolyte capacitor according to one embodiment of the invention, together with a lower perspective view thereof.
Figure 3B:
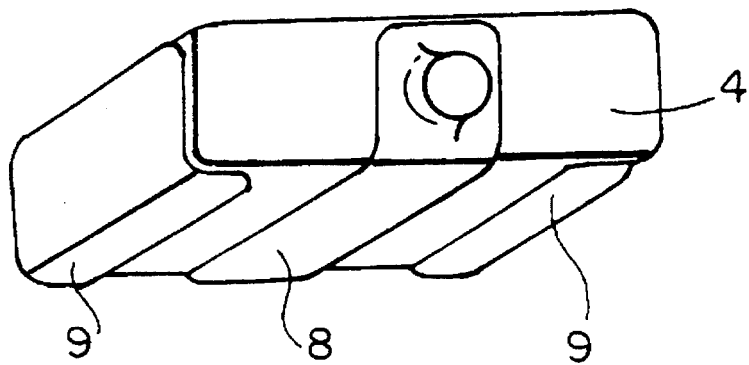

This invention will now be described referring to the attached drawings. FIG. 3 shows a cross section of a chip type solid electrolyte capacitor according to one embodiment of the invention, together with a lower perspective view thereof.

In a capacitor device 1 obtained by forming a water repellent resin layer 3 at the root of an anode body with its anode lead 2 being embedded and further a cathode conductor 40 resorting to the known technique, the two opposite faces of the cathode conductive layer adjacent to the anode lead and the anode lead embedded face are masked, and an insulating armour resin layer 4 is formed by means of fluidized bed dip coating method over the entire circumferential surface of the device except for the masked area.

Subsequently, the masking is remove, exposing the cathode conductive layer, and, a silver paste is baked onto the exposed cathode conductor layer exposed by removing the masking and the insulating armor resin layer 4 around it at 150° C. for 30 minutes, to form a conductive layer 5. A solution of palladium and an amine compound in butyl acetate is applied in a belt-like form along the central zones of the anode lead lead-through face and of one face, adjacent to the anode lead embedded face, on which the insulating armor resin layer is formed, followed by baking at 185° C. for 10 minutes to deposit the metal catalyst palladium.

A plating layer 6 is then formed on the conductor layer 5 and the palladium-deposited portions, and after a solder layer 7 is formed on the plating layer 6, the anode lead 2 is cut to complete a chip type solid electrolyte capacitor.

Figure 4A:
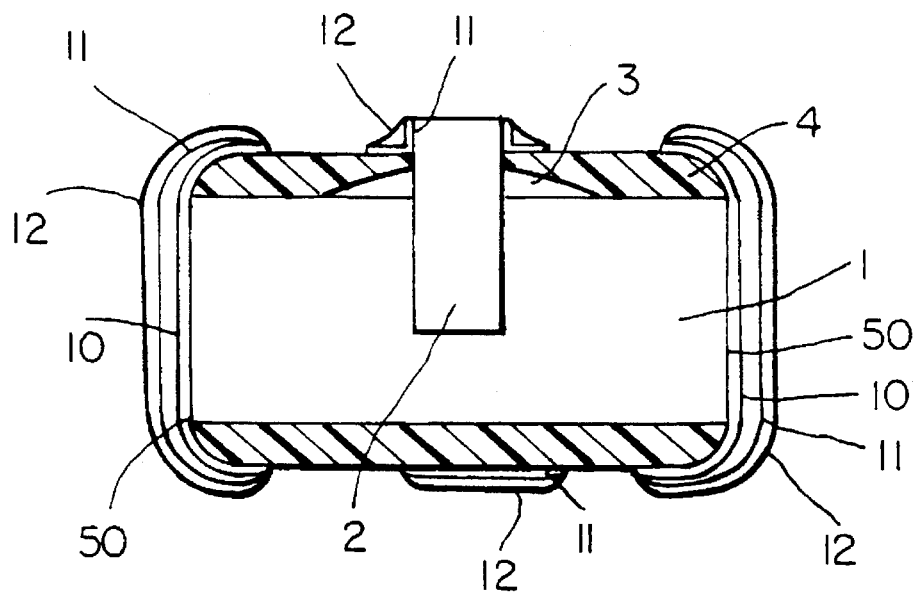
FIG. 4 shows a cross section of a chip type solid electrolyte capacitor according to another embodiment of the invention, together with an upper perspective view thereof.
Figure 4B:
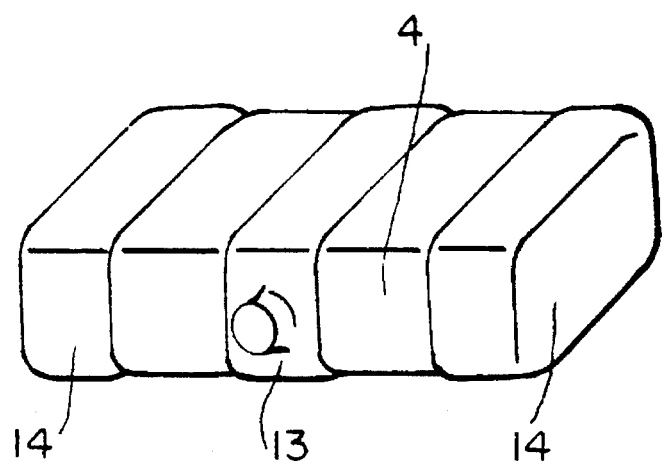

FIG. 4 shows across section of a chip type solid electrolyte capacitor according to another embodiment of the invention, together with an upper perspective view thereof.

In the capacitor device 1 obtained by forming a water repellent resin layer 3 being formed at the root of the anode body with its anode lead 2 being embedded and further a cathode conductor 50 resorting to the known technique, the two opposite faces adjacent respectively to the anode lead and the anode lead embedded face are masked, and an insulating armour resin layer 4 is formed by means of fluidized bed dip coating method over the entire circumferential surface of the device except for the masked area.

Subsequently, a silver paste is baked at 150° C. for 30 minutes onto the cathode conductor layer exposed by removing the masking and the insulating armor resin layer 4 around it to form a conductor layer 10, and a solution of palladium and an amine compound in butyl acetate is applied in a belt-like form circumferentially to the central zone of the chip including the anode lead, followed by baking at 185° C. for 10 minutes to deposit the metal catalyst palladium.

A plating layer 11 is then formed on the conductor layer 10 and on the palladium-deposited portions simultaneously, and after a solder layer 12 is formed on the plating layer 11, the anode lead 2 is cut to complete a chip type solid electrolyte capacitor.

As has been described heretofore, since the chip type solid electrolyte capacitor of the invention has an anode terminal electrode at the center of the chip and a pair of cathode terminal electrodes at each end of the chip, the chip capacitor enjoys the following effects:

(1) The polarity of the chip is not dependent on its orientation, and thus no accident happens such that the chip is mounted to the circuit board with wrong polarity to allow a voltage to be applied reversely thereto and cause breakdown.

(2) The anode terminal electrode formed circumferentially on the chip, as in the second embodiment, enables mounting of the chip into the circuit board at any of the three faces except for the anode lead embedded in it.

What is claimed is:

1. A capacitor comprising:

a body having a first pair of opposed faces, a second pair of opposed faces, and a third pair of opposed faces, said second pair of faces being in contact with said first pair and said third pair of faces, said first pair of faces having an area which is greater than the other pairs, said third pair of faces having an area which lesser than the other pairs, and said second pair of faces having an intermediate area with respect to the other pairs;

an anode lead embedded in the body at one of said second pair of opposed faces;

a resin layer formed on said first and second pairs of faces;

an anode terminal electrode connected to said anode lead and formed on the resin layer; so as to extend onto each of said first and second pairs of faces;

two cathode terminal electrodes being formed on said third pair of faces, each of said cathode terminal electrodes extending onto the resin layer on said first and second pairs of faces;

wherein each of said first pair of faces serves alternatively as an installing face.

2. The capacitor of claim 1 wherein:

said device comprises an anode body made of a valve-active metal.

3. The capacitor of claim 1 further comprising:

a cathode conductive layer is formed on said body and is disposed between the body and each of the two cathode terminal electrodes.

4. The capacitor of claim 1 wherein:

the anode terminal electrode is formed circumferentially about the capacitor.

5. The capacitor of claim 1 wherein:

each of said cathode terminal electrodes is formed so as to cover an entirety of one of said third pair of faces and to circumferentially cover an adjacent portion of each of said first and second pairs of faces.

6. The capacitor of claim 1 wherein:

each of said cathode terminal electrodes comprises a conductor layer of baked-on silver paste, a plating layer laid over said conductor layer, and a solder layer laid over said plating layer.

7. The capacitor of claim 1 wherein:

said anode terminal electrode comprises a plating layer and a solder layer laid over said plating layer.

\* \* \* \* \*